US010780752B1

(12) United States Patent
Niewiadomski et al.

(10) Patent No.: US 10,780,752 B1
(45) Date of Patent: Sep. 22, 2020

(54) VEHICLE HITCH BALL DETECTION SYSTEM

(71) Applicant: Ford Global Technologies, LLC, Dearborn, MI (US)

(72) Inventors: Luke Niewiadomski, Dearborn, MI (US); Nikhil Nagraj Rao, Sunnyvale, CA (US); Rick Haubenstricker, Saline, MI (US); Richard Campbell, Ann Arbor, MI (US); Mark Bowers, Clawson, MI (US); Lihui Chen, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/378,912

(22) Filed: Apr. 9, 2019

(51) Int. Cl.
*G08B 21/00* (2006.01)
*B60D 1/36* (2006.01)
*B60R 1/00* (2006.01)
*B62D 15/02* (2006.01)
*B60D 1/06* (2006.01)

(52) U.S. Cl.
CPC ............... *B60D 1/366* (2013.01); *B60D 1/06* (2013.01); *B60R 1/003* (2013.01); *B62D 15/027* (2013.01); *B60R 2300/105* (2013.01); *B60R 2300/305* (2013.01); *B60R 2300/808* (2013.01); *B60Y 2300/28* (2013.01)

(58) Field of Classification Search
CPC ...................................................... B60D 1/366
USPC ............... 340/431, 435, 436, 438, 903, 905; 701/41
See application file for complete search history.

(56) References Cited

U.S. PATENT DOCUMENTS

| 6,970,184 | B2 | 11/2005 | Hirama et al. |
| 7,151,443 | B2 | 12/2006 | Dialinakis |
| 7,596,275 | B1 | 9/2009 | Richardson et al. |
| 8,038,166 | B1 | 10/2011 | Piesinger |
| 8,451,107 | B2 | 5/2013 | Lu et al. |
| 9,085,261 | B2 | 7/2015 | Lu et al. |
| 9,880,560 | B2 | 1/2018 | Han et al. |
| 9,914,333 | B2 * | 3/2018 | Shank ................ B62D 15/0285 |
| 2006/0071447 | A1 | 4/2006 | Gehring et al. |
| 2013/0226390 | A1 | 8/2013 | Luo et al. |
| 2016/0023601 | A1 * | 1/2016 | Windeler ........... B62D 15/0275 348/118 |
| 2016/0272024 | A1 * | 9/2016 | Bochenek ................ B60D 1/36 |

(Continued)

FOREIGN PATENT DOCUMENTS

| EP | 1361543 A2 | 11/2003 |
| WO | 2013130479 A1 | 9/2013 |
| WO | 2016164118 A2 | 10/2016 |

*Primary Examiner* — Tai T Nguyen
(74) *Attorney, Agent, or Firm* — Raymond Coppiellie; Price Heneveld LLP

(57) ABSTRACT

A vehicle control system includes an imager mounted with and directed to a rear of the vehicle and outputting image data, a vehicle speed sensor mounted with the vehicle and outputting vehicle speed data, and an image processor receiving the image data and the vehicle speed data. The image processor is programmed to monitor a signal from the vehicle speed sensor and, when the signal from the vehicle speed sensor indicates a vehicle speed above a predetermined minimum speed, execute a feature extraction function to locate a hitch ball mounted to the vehicle in the image data.

19 Claims, 10 Drawing Sheets

(56) References Cited

U.S. PATENT DOCUMENTS

| | | | |
|---|---|---|---|
| 2016/0375831 A1* | 12/2016 | Wang | B62D 15/0295 |
| | | | 348/148 |
| 2017/0151846 A1* | 6/2017 | Wuergler | B60D 1/62 |
| 2017/0174130 A1 | 6/2017 | Hu et al. | |
| 2017/0177949 A1 | 6/2017 | Hu et al. | |
| 2018/0029429 A1* | 2/2018 | Janardhana | B60R 1/00 |
| 2019/0176687 A1* | 6/2019 | Nagata | B60Q 1/46 |

* cited by examiner

VEHICLE HITCH BALL DETECTION SYSTEM

FIELD OF THE DISCLOSURE

The present disclosure generally relates to a system including functionality for locating a hitch ball relative to a vehicle to which the hitch ball is mounted. In particular, the present system runs a hitch ball location function under certain free driving conditions.

BACKGROUND OF THE DISCLOSURE

Certain vehicle features benefit from knowing if a hitch is installed, and the exact position of the hitch relative to the vehicle. Some examples include an Automatic Hitch feature that aligns the vehicle hitch directly underneath a targeted trailer coupler. An Automated Parking feature that aligns the vehicle into a parking space. A Reverse Brake Assist feature that brakes before colliding into an object while traveling in reverse. A Trailer Backup feature, that aids the driver is steering a trailer in reverse, which depends on the geometry of the trailer tongue connection.

A well-performing hitch detection algorithm for use in a vehicle to detect the presence of a hitch ball and its position relative to the vehicle could be advantageous. Accordingly, further advancements may be desired.

SUMMARY OF THE DISCLOSURE

According to one aspect of the present disclosure, a vehicle control system includes an imager mounted with and directed to a rear of the vehicle and outputting image data, a vehicle speed sensor mounted with the vehicle and outputting vehicle speed data, and an image processor receiving the image data and the vehicle speed data. The image processor is programmed to monitor a signal from the vehicle speed sensor and, when the signal from the vehicle speed sensor indicates a vehicle speed above a predetermined minimum speed, execute a feature extraction function to locate a hitch ball mounted to the vehicle in the image data.

Embodiments of the first aspect of the invention can include any one or a combination of the following features:

- The system further includes a vehicle switchgear configurable between a park mode and at least one driving mode, the image processor receives a state indication from the switchgear, and the image processor executes the feature extraction function to locate the hitch ball only when the switchgear state indication corresponds with the vehicle being shifted from the park mode into the at least one driving mode and the signal from the vehicle speed sensor indicates the signal above the predetermined minimum speed;
- The image processor executes the feature extraction function to locate the hitch ball only when the signal from the vehicle speed sensor indicates the signal above the predetermined minimum speed and below a predetermined maximum speed;
- The image data includes a series of still image frames at sequential intervals, and the feature extraction function includes a continuous analysis of successive still images;
- The continuous analysis of successive still images includes deriving a preliminary hitch ball location for each of the successive still images, and the feature extraction routine filters the preliminary hitch ball location for each of the successive still images to converge on a final hitch ball location;
- The feature extraction routine converges on a final hitch ball location using an algorithmic confidence assessment based on the analysis of successive still images, and the final hitch ball location is determined when the confidence assessment reaches a predetermined threshold;
- The final hitch ball location includes one of a distance of a detected hitch ball from a rear of the vehicle or a null value when no hitch ball is located when the confidence assessment reaches a predetermined threshold;
- The image processor executes the feature extraction function to locate the hitch ball mounted to the vehicle in the image data when the signal from the vehicle speed sensor indicates a vehicle speed above a predetermined minimum speed over a time interval until the hitch ball has been located, and the image processor stops the feature extraction function when one of the hitch ball has been located or the signal from the vehicle speed sensor indicates that the vehicle speed has changed to below the predetermined minimum speed;
- The image processor stores a location of the hitch ball in memory when the feature extraction function locates the hitch ball;
- The image processor compares the location of the hitch ball to at least one previously stored hitch ball location prior to storing the location of the hitch ball in memory and only stores the location of the hitch ball in memory if the location of the hitch ball is different from the one or more previously stored hitch ball location;
- The system further includes a vehicle steering system, and the image processor is included in a controller that derives position data for a coupler of a trailer using the image data, derives a vehicle path to position the location of the hitch ball stored in memory in an aligned position with the coupler, and outputs a steering control signal to the steering system to maintain the vehicle along the path;
- The system further includes a vehicle steering system and an input including a rotating element, and the image processor is included in a controller that uses an input from the rotating element to as a trailer backup control signal and controls the vehicle steering system to maintain the vehicle, when coupled with a trailer at the hitch ball location, on a backing path determined using the hitch ball location; and
- The system further includes a vehicle brake system, and the image processor is included in a controller that executes at least one automated reverse braking feature based on a position of the rear of the vehicle including the hitch ball location.

According to another aspect of the present disclosure, a vehicle includes a vehicle steering system, an imager mounted with and directed to a rear of the vehicle and outputting image data, a vehicle speed sensor mounted with the vehicle and outputting vehicle speed data, and a controller. The controller operates in a free driving mode including receiving the image data and the vehicle speed data, monitoring a signal from the vehicle speed sensor, and, when the signal from the vehicle speed sensor indicates a vehicle speed above a predetermined minimum speed, executing a feature extraction function to determine a location of a hitch ball mounted to the vehicle in the image data. The controller further operates in a hitch assist driving mode including outputting a steering control signal to the steering system in reversing of the vehicle to align the hitch ball location with a coupler of a trailer.

According to another aspect of the present disclosure, a method for determining the location of a hitch ball coupled with a vehicle includes monitoring a signal from a vehicle speed sensor and, when the signal from the vehicle speed sensor indicates a vehicle speed above a predetermined minimum speed, executing a feature extraction function on image data received from an imager mounted with and directed to a rear of the vehicle to identify a hitch ball mounted to the vehicle in the image data and extracting the location of the hitch ball from an output of the feature extraction function.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
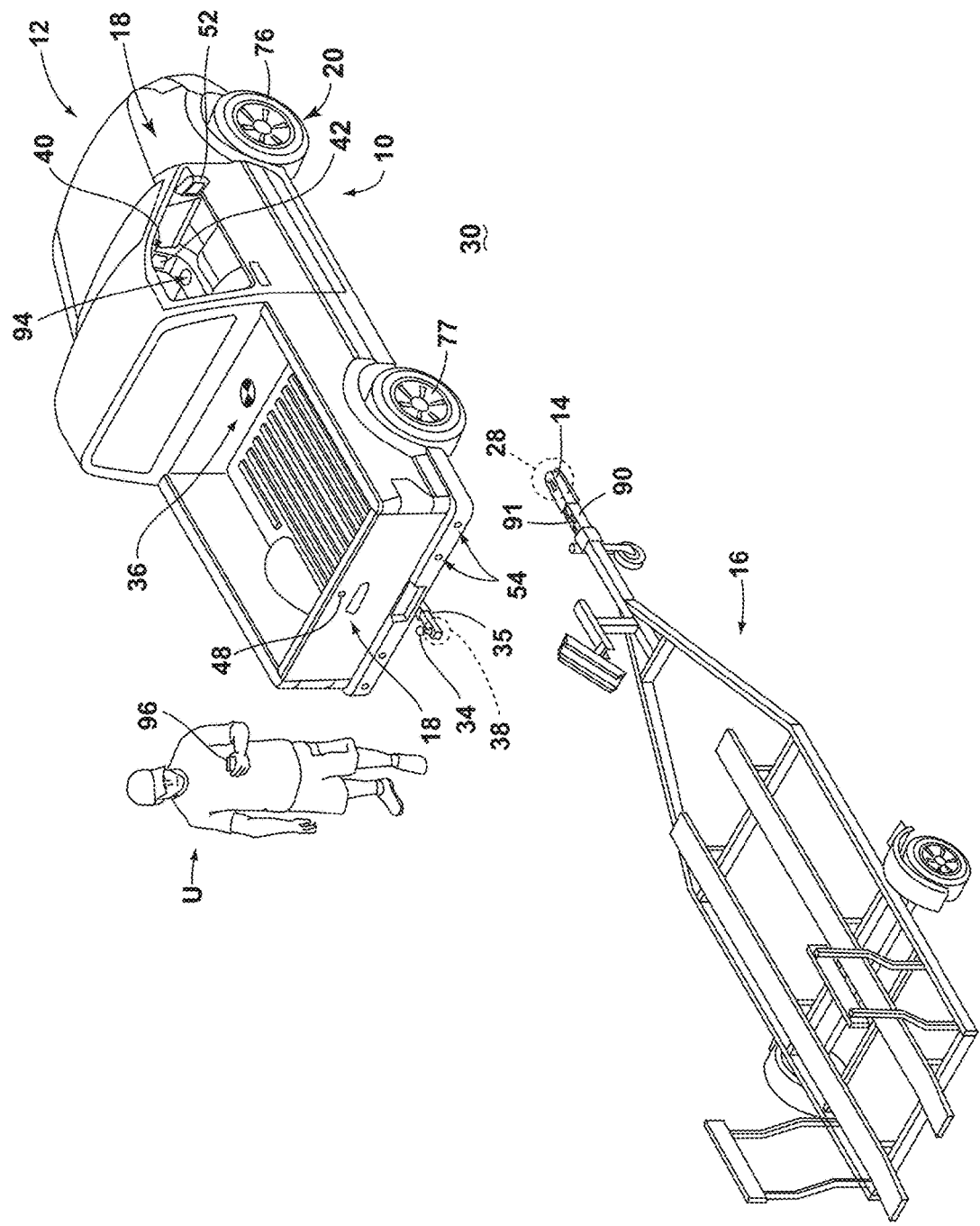
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Figure 2:
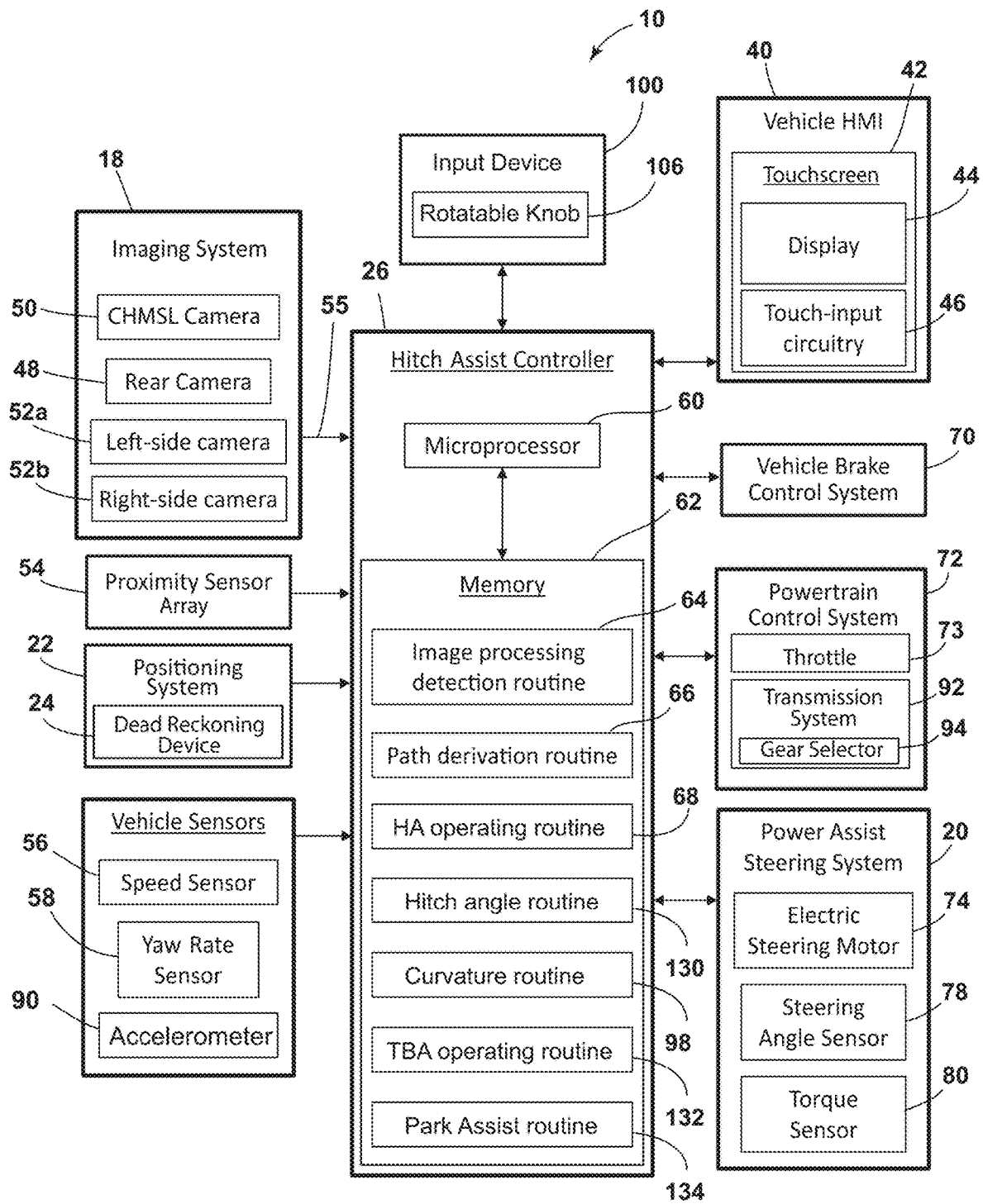
FIG. 2 is a diagram of a system according to an aspect of the disclosure that executes operations for assisting in various maneuvers of the vehicle, including with respect to the trailer, and for locating a hitch ball of the vehicle in connection with such maneuvers.

Referring generally to FIGS. 1-11, reference numeral 10 designates a vehicle control system 10 including various combinations of subsystems and routines (e.g., path derivation routine 66, hitch assist operating routine 68, hitch angle routine 130, curvature routine 98, trailer backup assist ("TBA") operating routine, and park assist routine 134, as shown in FIG. 2 and discussed in various examples herein). In one aspect, the vehicle control system 10 includes an imager (e.g., camera 48) mounted with and directed to a rear of the vehicle 12 and outputting image data 55, a vehicle speed sensor 56 mounted with the vehicle and outputting vehicle speed data, and an image processor (e.g. controller 26 executing image processing routine 64) receiving the image data 55 and the vehicle speed data. The image processor (controller 26 executing image processing routine 64, as discussed below) is programmed monitor a signal from the vehicle speed sensor 56 and, when the signal from the vehicle speed sensor 56 indicates a vehicle speed above a predetermined minimum speed, execute a feature extraction function to locate a hitch 34 ball mounted to the vehicle 12 in the image data 55.

As shown in FIGS. 1 and 2, the vehicle control system 10 may be in the form of a driver assistance system 10 with the aforementioned subsystems and routines being configured to assist the driver of vehicle 12 in various maneuvers. In this respect, the driver assistance system 10 can be considered to have functionality that may generally be described as facilitating autonomous or semi-autonomous driving in at least those respects. In the example of system 10 shown in FIG. 2, the maneuvers with which system 10 is configured to assist a driver include hitching vehicle 12 with a trailer, such as trailer 16 depicted in FIG. 1, reversing the vehicle 12 when hitched with trailer 16, and parking vehicle 12. In this respect, system 10 includes the aforementioned controller 26, which has a microprocessor 60, or the like, and memory 62 including operational routines that can be executed by microprocessor 60 to control vehicle 12 in the desired manner to assist the driver in executing these maneuvers. In particular, memory 62 is shown as including a path routine 66 for determining a path 32 to align vehicle 12 with trailer 16 for connecting the two together and a hitch assist ("HA") operating routine 68 for controlling movement of vehicle 12 along that path 32, as discussed further below with respect to FIGS. 3 and 4. Additionally, memory 62 includes hitch angle estimation routine 130 and a curvature routine 132 for controlling the backing of vehicle 12 when coupled with trailer 16 to maintain the combined vehicle 12 and trailer 16 along a curvature controllable/selectable by the driver, as discussed further below with respect to FIGS. 7 and 8. Still further, memory 62 includes a park assist routine 134 that controls the movement of vehicle 12 into a parking space of varying configurations, as described further below with respect to FIG. 9.

As discussed herein, the controller 26, in executing these various routines, uses an imaging processing routine 64 in various ways to identify certain features surrounding vehicle 12, locate such features in a frame of reference with respect to vehicle 12, and to track such features with movement of vehicle 12. In this respect, the routines associated with the trailer hitching assistance, trailer backing assistance, and parking assistance can use image processing routine 64 to determine if a trailer hitch ball 34 is installed with vehicle 12 and to determine a location of a detected hitch ball 34 with respect to vehicle 12 (including with respect to the rear of vehicle 12, such as the adjacent bumper or the like). As described further below, the hitching assistance functionality utilizes the location of the hitch ball 34 to determine when the vehicle 12 is appropriately aligned with the trailer 16 for connection therewith, and the trailer backing assistance functionality uses the location of the hitch ball 34 controlling the curvature of backing for the vehicle 12 and trailer 16 combination. Further, as parking maneuvers are often executed in a reversing direction, making the presence of a hitch ball 34 and its location relative to vehicle 12 available to the parking routine can help in guiding vehicle 12 into a desired parking space without causing hitch ball 34 (or the related ball mount 35) from colliding with anything surrounding vehicle 12. In a similar manner, the location 38 of hitch ball 34 can be useful for various additional vehicle systems, including a backup alert system, which can adjust its parameters to take the position of a hitch ball 34 into account. A variation of controller 12 with this and similar functionality is, therefore, also presently contemplated. Controller 12 or an additional on-board computer within vehicle 12 can allow for selective implantation of such routines by a user.

With respect to the general operation of the driver assistance system 10, as illustrated in the system diagram of FIG. 2, system 10 includes various sensors and devices that obtain or otherwise provide vehicle status-related information that is useable to generate and output the reverse hitching path control signal related to hitching assistance functionality of system 10, as well as to generate and output the trailer backing path control signal related to trailer backup assistance functionality of system 10 and to control movement of vehicle 12 in moving into a parking space. This information includes positioning information from a positioning system 22, which may include a dead reckoning device 24 or, in addition or as an alternative, a global positioning system (GPS), to determine a coordinate location of the vehicle 12 based on the one or more locations of the devices within the positioning system 22. In particular, the dead reckoning device 24 can establish and track the coordinate location of the vehicle 12 within a localized coordinate system 82 based at least on vehicle speed and steering angle δ. Other vehicle information received by driver assistance system 10 may include a speed of the vehicle 12 from a speed sensor 56 and a yaw rate of the vehicle 12 from a yaw rate sensor 58. It is contemplated that in additional embodiments, a proximity sensor 54 or an array thereof, and other vehicle sensors and devices may provide sensor signals or other information, such as sequential images of a trailer 16, including the detected coupler 14, that the controller 26 of the driver assistance system 10 may process with various routines to determine the height H and position (e.g., based on the distance $D_h$ and angle $α_h$) of a coupler 14 of a trailer 16 in the general area of vehicle 12, as discussed further below.

As further shown in FIG. 2, one embodiment of the driver assistance system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle δ. In the illustrated embodiment, the power assist steering system 20 is an electric power-assisted steering ("EPAS") system including electric steering motor 74 for turning the steered wheels 76 to a steering angle δ based on a steering command, whereby the steering angle δ may be sensed by a steering angle sensor 78 of the power assist steering system 20. The steering command 69 may be provided by the driver assistance system 10 for autonomously steering during a trailer hitch alignment maneuver and may alternatively be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 may be provided on the power assist steering system 20 that senses torque on the steering wheel that is not expected from autonomous control of the steering wheel and therefore indicative of manual intervention, whereby the driver assistance system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 3:
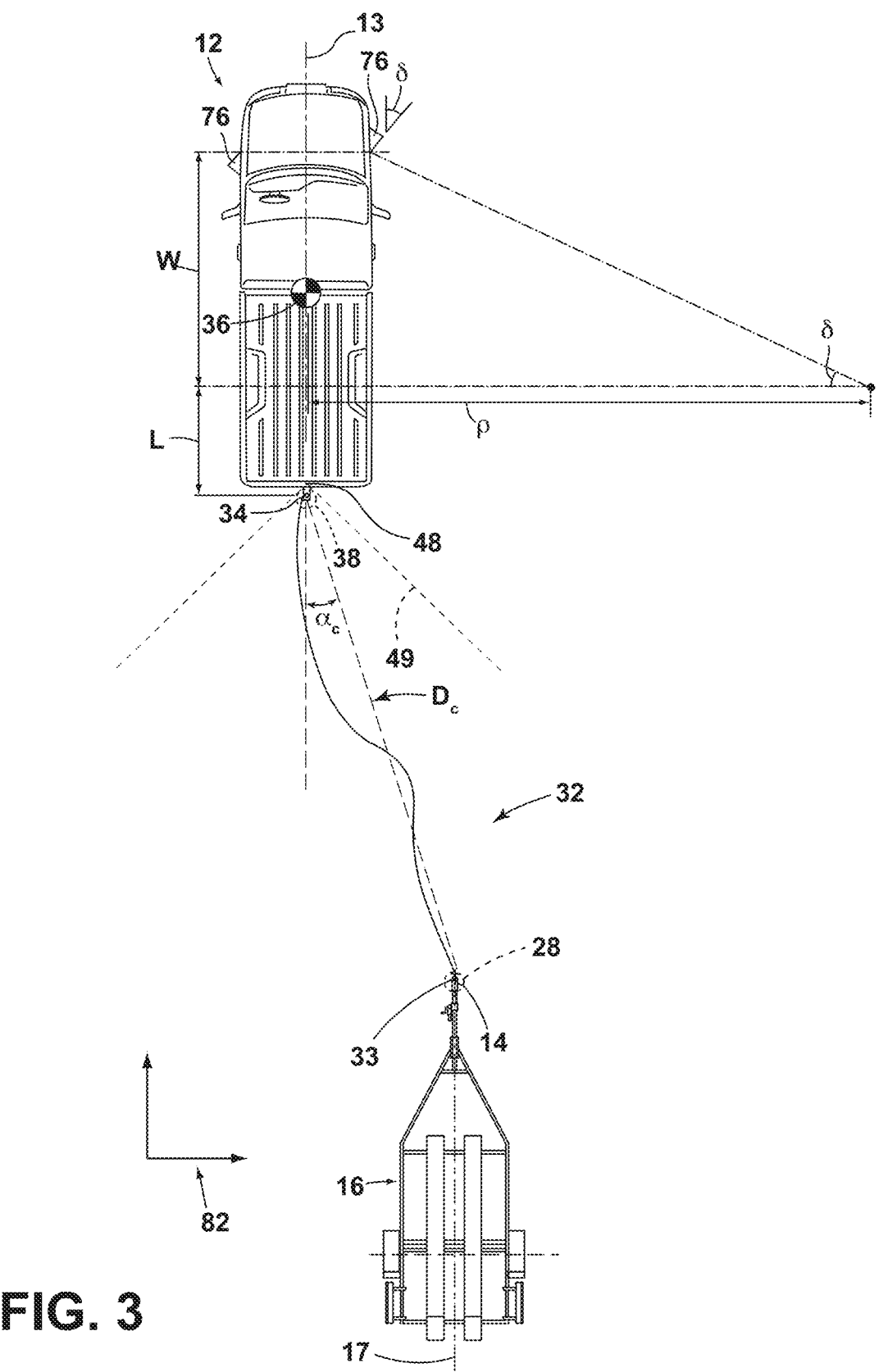
FIG. 3 is an overhead schematic view of a vehicle during a step of a sequence for assisting in aligning the vehicle with a trailer in a position for hitching the trailer to the vehicle executable by the system.

With continued reference to FIG. 2, the power assist steering system 20 provides the controller 26 of the driver assistance system 10 with information relating to a rotational position of steered wheels 76 of the vehicle 12, including a steering angle δ. The controller 26 in the illustrated embodiment processes the current steering angle, in addition to other vehicle 12 conditions to guide the vehicle 12 along a desired path 32 (FIG. 3). It is conceivable that the driver assistance system 10, in additional embodiments, may be an integrated component of the power assist steering system 20. For example, the power assist steering system 20 may include a hitch assist routine and a trailer backup assist routine for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the driver assistance system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, as well as using one or more of the cameras 48, 50, 52a, 52b to track the positions of identifiable ground items or portions over time. In some embodiments, individual wheel speeds can also be used to determine a vehicle yaw rate γ, which can be provided to the driver assistance system 10 in the alternative or in addition to the vehicle yaw rate sensor 58. The driver assistance system 10 can, further, provide vehicle braking information to the brake control system 70 for allowing the driver assistance system 10 to control braking of the vehicle 12 during backing of the trailer 16. For example, the driver assistance system 10, in some embodiments, may regulate speed of the vehicle 12 during alignment of the vehicle 12 with the coupler 14 of trailer 16 (i.e., when implementing hitching assistance functionality), which can reduce the potential for a collision with trailer 16, and can bring vehicle 12 to a complete stop at a determined endpoint 33 of path 32. It is disclosed herein that the driver assistance system 10 can additionally or alternatively issue an alert signal corresponding to a notification of an actual, impending, and/or anticipated collision with a portion of trailer 16. The powertrain control system 72, as shown in the embodiment illustrated in FIG. 2, may also interact with the driver assistance system 10 for regulating speed and acceleration of the vehicle 12 during partial or autonomous alignment with trailer 16. As mentioned above, regulation of the speed of the vehicle 12 may be advantageous to prevent collision with trailer 16.

Additionally, the driver assistance system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like can be used in place or in addition to touchscreen 42. Further, the driver assistance system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands (i.e., the above-mentioned reverse hitching path control signal and a trailer backing path control signal) as a function of all or a portion of the information received. During the hitching assistance mode, the vehicle steering information and commands may be provided to the power assist steering system 20, during the hitching assistance mode, for affecting steering of the vehicle 12 to achieve a commanded path 32 (FIG. 3) of travel for alignment with the coupler 14 of trailer 16. The controller 26 may include the microprocessor 60 and/or other analog and/or digital circuitry for processing one or more routines. Also, the controller 26 may include the memory 62 for storing one or more routines, including the image processing 64 routine, path derivation routine 66, operating routine 68, hitch angle routine 130, curvature routine 98, trailer backup assistance operating routine 132, and park assist routine 134, as discussed further below. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated that the image processing routine 64 may be carried out by a dedicated processor, for example, within a stand-alone imaging system for vehicle 12 that can output the results of its image processing to other components and systems of vehicle 12, including microprocessor 60. Further, any system, computer, processor, or the like that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which in the illustrated examples include rear camera 48, center high-mount stop light (CMHSL) camera 50, and side-view cameras 52a and 52b, although other arrangements including additional or alternative cameras are possible. In one example, imaging system 18 can include rear camera 48 alone or can be configured such that system 10 utilizes only rear camera 48 in a vehicle with multiple exterior cameras. In another example, the various cameras 48, 50, 52a, 52b included in imaging system 18 can be positioned to generally overlap in their respective fields of view, which in the depicted arrangement include fields of view 49, 51, 53a, and 53b to correspond with rear camera 48, center high-mount stop light (CMHSL) camera 50, and side-view cameras 52a and 52b, respectively. In this manner, image data 55 from two or more of the cameras can be combined in image processing routine 64, or in another dedicated image processor within imaging system 18, into a single image. In an extension of such an example, the image data 55 can be used to derive stereoscopic image data that can be used to reconstruct a three-dimensional scene of the area or areas within overlapped areas of the various fields of view 49, 51, 53a, 53b, including any objects (obstacles or coupler 14, for example) therein. In an embodiment, the use of two images including the same object can be used to determine a location of the object relative to the two image sources, given a known spatial relationship between the image sources. In this respect, the image processing routine 64 can use known programming and/or functionality to identify an object within image data 55 from the various cameras 48, 50, 52a, and 52b within imaging system 18. In either example, the image processing routine 64 can include information related to the positioning of any cameras 48, 50, 52a, and 52b present on vehicle 12 or utilized by system 10, including relative to the center 36 (FIG. 1) of vehicle 12, for example such that the positions of cameras 48, 50, 52a, and 52b relative to center 36 and/or to each other can be used for object positioning calculations and to result in object position data relative to the center 36 of vehicle 12, for example, or other features of vehicle 12, such as hitch ball 34 (FIG. 1), with known positions relative to center 36.

Referring to FIGS. 5A-5C and 6, in some examples, the rear camera 48 may be disposed within the tailgate 94, or any other rear portion of the vehicle 12, and configured to provide image data 55 rearwardly of the vehicle 12. The camera 48 may be capable of imaging a top view of the hitch ball 34 and can provide the image data 55 to the controller 26 for use by the image processing routine 64 to determine the position 38 of hitch ball 34 within the image data 55, which is then correlated, as discussed above, with the positioning and configuration of camera 48 to determine the relative location of hitch ball 34 with respect to vehicle 12 (e.g., relative to center 36). Once the position 38 of the hitch ball 34 is determined, the system 10 can store the position 38 and/or location of hitch ball 34 in memory 62, including for future use, as discussed below. As discussed above, in typical systems executing variations of the vehicle control functions discussed above, the hitch ball 34 location function is run at the time of feature activation, for any of such features.

Figure 5A:
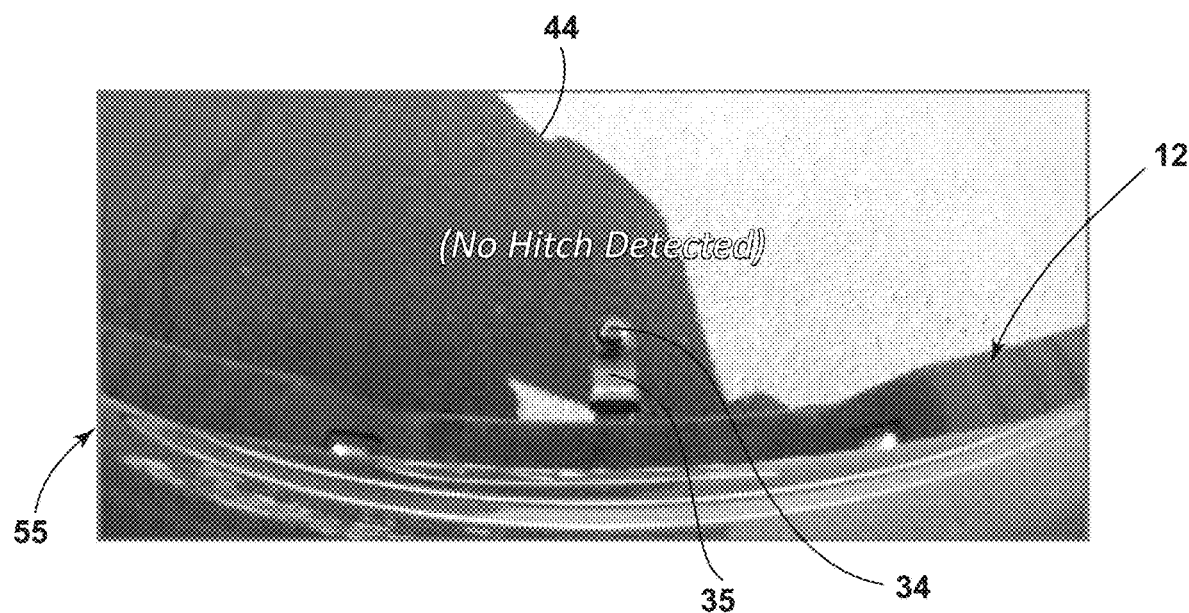
FIG. 5A is a depiction of an image received from a vehicle camera during an unsuccessful hitch ball identification and location process executed with the vehicle at a standstill.
Figure 5B:
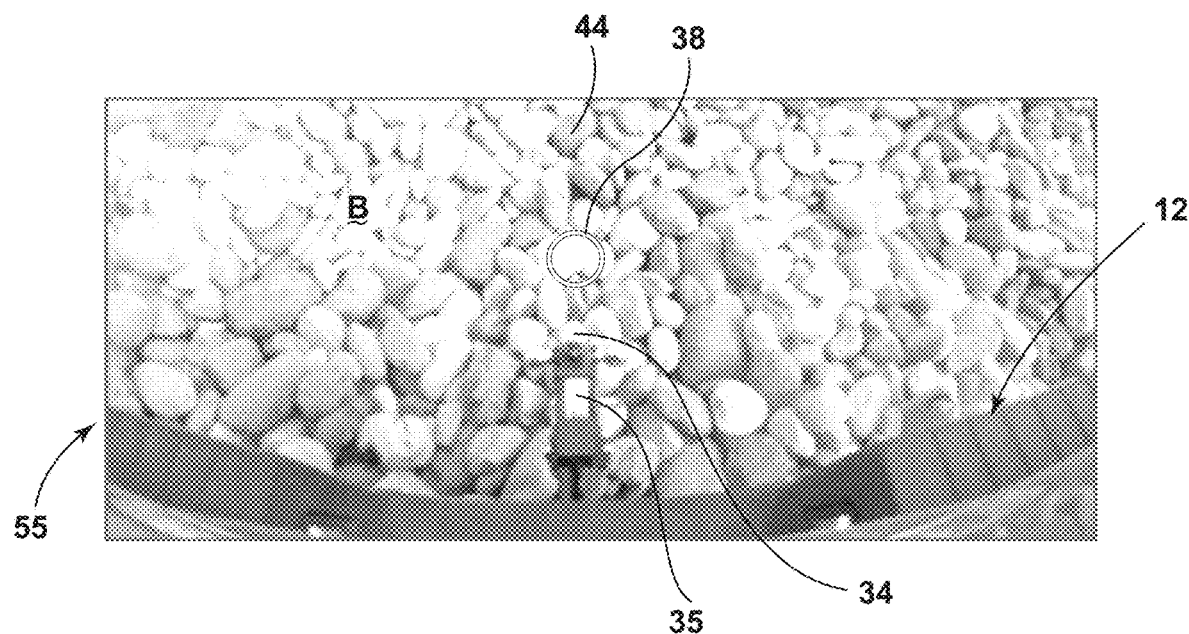
FIG. 5B is a depiction of an alternative image received from a vehicle camera during a further unsuccessful hitch ball identification and location process executed with the vehicle at a standstill.
Figure 5C:
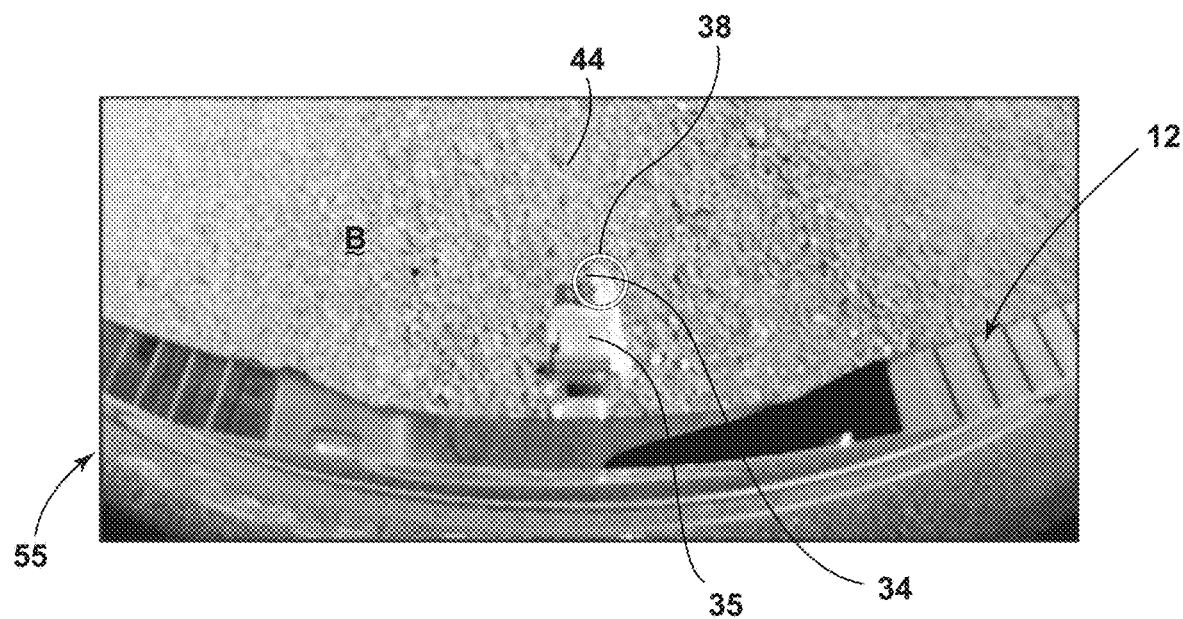
FIG. 5C is a depiction of an alternative image received from a vehicle camera during a further unsuccessful hitch ball identification and location process executed with the vehicle at a standstill.
Figure 6:
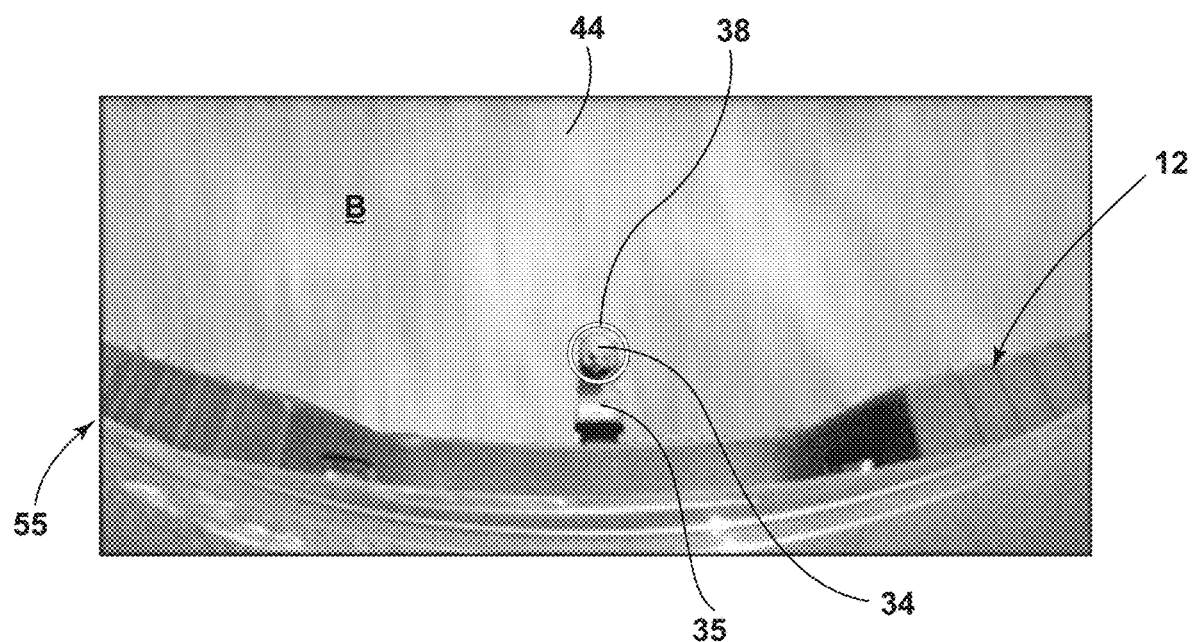
FIG. 6 is a depiction of an image received from a vehicle camera during a successful hitch ball identification and location process executed with the vehicle in motion.

As can be appreciated, the various driving assistance features of system 10 (e.g., hitch assist, trailer backup assist, park assist, etc.) described herein are typically initiated when vehicle 12 is at a standstill, as this improves the ability of system 10 to identify, for example, the coupler 14 of trailer 16 and/or to perform a handoff process to allow the vehicle 12 to assume control of various driving functions. At standstill, however, the image data 55 from rear camera 48 includes a static background B behind the hitch ball 34, as shown in FIGS. 5A-5C, which may be disadvantageous to the image processing routine 64 in attempting to identify hitch ball 34. In some situations, attempting to locate hitch ball 34 at standstill may cause the hitch ball to be undetected, even though it is present, such as in the example of FIG. 5A (where the hitch ball 34 is shown as being obscured by a shadow). In other situations, such as in the example of FIG. 5B, the hitch position 38' may be detected inaccurately, such as by confusion of an environmental feature (e.g., a rock or the like) for the hitch ball on the part of image processing routine 64. In such a situations a hitch ball 34 may even be thought to be detected when no hitch is installed. In a further example, shown in FIG. 5C, various ambient conditions, such as lighting and the like and/or the ground texture, etc. may interfere with the accuracy in determining the actual position 38' of a detected hitch 34. For at least this reason, it may be disadvantageous to attempt to locate hitch ball 34 using image processing routine 64 on the activation of driving feature.

In this respect, the controller 26 described herein operates attempts to locate hitch ball 34 using image processing routine 64 when vehicle 12 is in a free driving mode (i.e., during normal driving (in forward or reverse) under the control of the driver, when none of the driving assistance features that uses the hitch ball location 38 is running. In this respect, at least some free driving may be required before activation of such features is possible. However, when such requirement is met, performance of such features may be improved by the improvement in the determination of the hitch ball location 38, which may, accordingly, be stored in memory 62 for use by any of the routines (path derivation routine 66, hitch assist operating routine 68, hitch angle routine 130, curvature routine 98, TBA operating routine, and park assist routine 134), when needed.

Accordingly, the present system 10 may improve the performance of hitch detection using image processing routine 64 by performing the task during free-driving of the vehicle 12 at low speeds. In this respect, image processing routine 64 may perform better during vehicle motion, as the background B behind the hitch ball 34 changes, allowing image processing routine 64 to distinguish the hitch ball 34 more easily and/or with improved accuracy. In this manner, the accuracy of the determination of the hitch ball 34 position 38 is increased, and the rate of false negative and false positive detections (such as by the conditions in the examples discussed above with respect to FIGS. 5A-5C) may be decreased.

In implementations of the present system 10, specific conditions may be selected for which to use image processing routine 64 for hitch ball 34 detection. In this manner, controller 26 may include logic to dictate when to run and pause or terminate the function (e.g., so that it does not run during the entire drive cycle). Additionally, a framework of data storage is described, with considerations made for data accessibility and flash memory wear-endurance. In one aspect, the image processing routine 64 executes a feature extraction function to locate the hitch ball 34 only when the signal from the vehicle speed sensor 56 indicates a vehicle speed above the predetermined minimum speed. Additionally, the image processing routine 64 can end the feature extraction function to stop attempting to locate hitch ball 34 when the signal from the vehicle speed sensor 56 indicates that the vehicle speed is above a predetermined maximum speed. In this respect, the background B in the image data 55 can become blurred above certain speeds, such that the background B appears as a solid object to the image processing routine 64, which diminishes the effectiveness in locating hitch ball 34 in the same manner as having vehicle 12 at a standstill or low speed. Additionally, the use of image processing routine 64 to locate hitch ball 34 can be considered a low priority application, so other vehicle 12 functions, including other functions of controller 26, of the vehicle 12 engine control unit ("ECU"), or the like can override image processing routine 64 in this respect.

In this respect, the image controller 26 executes the feature extraction function by way of image processing routine 64 to locate the hitch ball 34 mounted to the vehicle in the image data 55 when the signal from the vehicle speed sensor 56 indicates a vehicle speed above a predetermined minimum speed. The routine 64 continues to operate as long as the speed is above the minimum speed until the hitch ball 34 has been located. In the additional example, the controller 26 may stop the feature extraction function when the signal from the vehicle speed sensor 56 indicates that the vehicle exceeds a second, higher maximum speed. In such situations, it is noted that the feature extraction function runs continuously, analyzing each camera frame included in the stream of image data 55. Each frame is continuously analyzed until the routine 64 obtains an acceptable confidence value corresponding with wither the position 38 of the hitch ball 34, or a determination that no hitch ball present. In this manner, the image data 55 includes a series of still image frames at sequential intervals, and the feature extraction function of includes a continuous analysis of the successive still images. For each frame, the image processing routine 64 derives a preliminary hitch ball location 38, and the feature extraction routine filters the preliminary hitch ball location 38 for each of the successive still images to converge on a final hitch ball location. In this respect, if the feature extraction process of the image processing routine 64 can pause when, for example, the speed of the vehicle 12 is detected as being below the minimum speed or above the maximum speed so that, when the conditions are appropriate and the process resumes, it does not have to start over.

Again, the feature extraction routine starts by deriving a preliminary hitch ball location in an initial image frame and converges on a final hitch ball location 38 using an algorithmic confidence assessment based on the analysis of successive still images, the final hitch ball location is determined when the confidence assessment reaches a predetermined threshold. The final hitch ball location includes one of a distance of a detected hitch ball from a rear of the vehicle or a null value when no hitch ball is located when the confidence assessment reaches a predetermined threshold. The number of captured images and/or the time elapsed in between capturing images may be predetermined. The predetermined number of captured images may, as described below, depend on pixel or intensity values of an averaged or combined image. The controller 26 may average or combine the captured images into an averaged or combined image patch through usage of the routine 64. In general, the averaging process includes averaging the pixels of the series of captured images after optionally stabilizing the images (i.e., aligning them to account for slight vibrations by the camera 48). The controller 26 may find outer edges of objects within the averaged or combined image. The controller 26 finds the outer edges by analyzing the averaged or combined image. In general, the analyzing process involves determining an interface between items statically affixed to the vehicle 12 and undetectable background noise (e.g., achieved by movement of the background image B). The controller 26 associates specific pixels on the averaged image with a real-world spatial position to locate the position 38 of hitch ball within the established frame of reference relative to vehicle 12. In additional aspect, the position data may also include a known reference length, such as the diameter of the hitch ball 34, which may also allow the position data to include the height of hitch ball 34. Thus, the controller 26 may determine dimensions of objects defined by specific pixels. For example, the length of the ball mount 35 may be compared to the diameter of the hitch ball 34 to determine the length of the ball mount 35 by comparing the number of pixels. It will be appreciated, however, that the length of the ball mount 35 may also be calculated by other sensors or modules in the vehicle 12 using any distance measuring technique.

When the location 38 of the hitch ball 34 is arrived at with the required level of confidence, according to the particular parameters of the image processing routine 64, controller 26 extracts location data (e.g. at least its relationship to center 36 along the longitudinal axis 13 of vehicle 12) for the hitch 34 and stores the location 38 of the hitch ball 34 in memory 62. As discussed above, controller 26 can be configured to help avoid wear on memory 62 by comparing the location 38 of the hitch ball 34 to at least one previously-stored hitch ball 34 location 38 prior to actually storing the location of the hitch ball in memory 62. Controller 26 may only store the location 38 of the hitch ball 34 output by the image processing routine 64 in memory 62 if the location 38 of the hitch ball 34 is different from the one or more previously stored hitch ball 34 locations 38. When stored, the hitch ball location 38 is stored in persistent or semi-persistent memory 62, to be accessed by all features which request this data later in time (including, but not limited to the examples discussed above). It is noted that persistent memory survives key cycles of the vehicle 12, as some features may be configured to access a last positive detection/location (for instance, if a feature is initiated at night, when no detection can be made, depending on the feature). In these cases, it may be assumed the hitch ball 34 has not been removed since the last detection, or vice versa if one was not detected prior. If the input requirements of the particular features of vehicle 12 using this data do not wish to know data across key-cycles, then semi-persistent memory may be sufficient. Since persistent flash memory often can wear with use, the hitch ball position 38 data is only written once the hitch ball data changes from a previous measurement.

In a further aspect, controller 26 may be configured to only implement the hitch detection function when vehicle 12 shifts or is shifted out of its park mode/gear before being determined to be above the minimum speed. In this respect, controller 26 is in communication with vehicle switchgear (also referred to as a gear selector) 94, which is configured to output a switchgear state indication receivable by controller 26. The gear selector 94 is configurable between the aforementioned park mode and at least one driving mode. The controller 26, accordingly, receives a state indication from the switchgear 94 and only looks for when the signal 55 from the vehicle speed sensor indicates the signal above the predetermined minimum speed to execute the feature extraction function to locate the hitch ball 34 after the switchgear 94 state indication corresponds with the vehicle being shifted from the park mode into the at least one driving mode (e.g., a basic drive mode in a vehicle 12 with an automatic transmission). This initial step results in the hitch detection function not being run continuously at all low speeds, which prevents, for example, restarting of the function hundreds of times during a traffic jam or city driving. The controller 26, thusly configured, only re-runs after the vehicle shifts into park and back out of park, or is turned off, started again, and shifted into park. In this respect, it may be considered highly unlikely that the state of the vehicle hitch ball 34 changes (i.e. being changed, installed, or removed) without the vehicle 12 being in park.

In one aspect, the image processing routine 64 can also be specifically programmed or otherwise configured to locate coupler 14 within image data 55. In one example, the image processing routine 64 can identify the coupler 14 within the image data 55 based on stored or otherwise known visual characteristics of coupler 14 or hitch couplers in general. In another embodiment, a target 91 in the form of a sticker or the like may be affixed with trailer 16 in a specified position relative to coupler 14 in a manner similar to that which is described in commonly-assigned U.S. Pat. No. 9,102,271, the entire disclosure of which is incorporated by reference herein. In such an embodiment, image processing routine 64 may be programmed with identifying characteristics of the target 91 for location in image data 55, as well as the positioning of coupler 14 relative to such a target 91 so that the position 28 of coupler 14 can be determined based on the target 91 location. Additionally or alternatively, controller 26 may seek confirmation of the determined coupler 14, via a prompt on touchscreen 42. If the coupler 14 determination is not confirmed, further image processing may be provided, or user-adjustment of the position 28 of coupler 14 may be facilitated, either using touchscreen 42 or another input to allow the user to move the depicted position 28 of coupler 14 on touchscreen 42, which controller 26 uses to adjust the determination of position 28 of coupler 14 with respect to vehicle 12 based on the above-described use of image data 55. Alternatively, the user can visually determine the position 28 of coupler 14 within an image presented on HMI 40 and can provide a touch input coupler 14 in a manner similar to that which is described in co-pending, commonly-assigned U.S. patent application Ser. No. 15/583,014, the entire disclosure of which is incorporated by reference herein. The image processing routine 64 can then correlate the location of the touch input with the coordinate system 82 applied to image 30.

Figure 4:
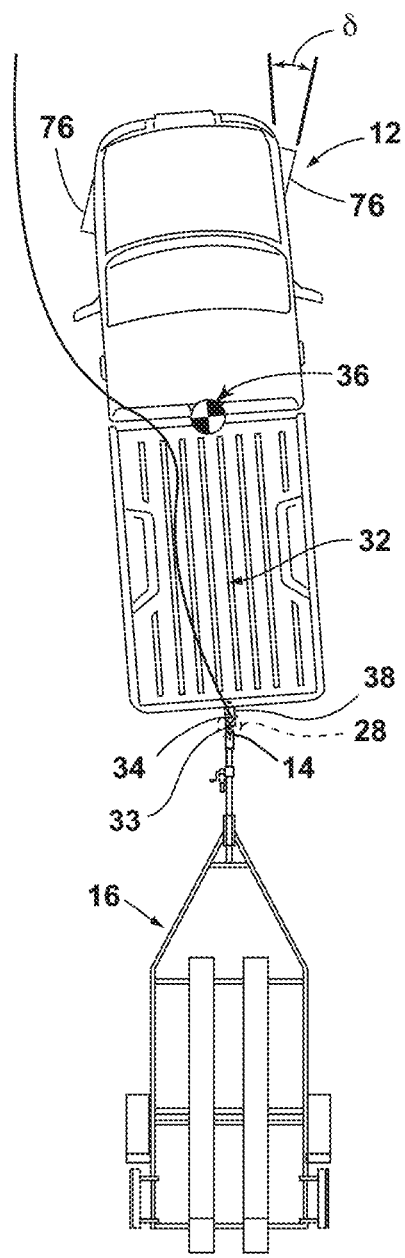
FIG. 4 is an overhead schematic view of the vehicle during a subsequent step of the alignment sequence with the trailer and showing the position of a hitch ball of the vehicle at an end of a derived alignment path.

As shown in FIGS. 3 and 4, the above-described hitch assistance functionality of controller 26 can use the position 38 of hitch ball 34 stored in memory, according to the above-described process. In this aspect, the image processing routine 64 and operating routine 68 may be used in conjunction with each other to determine the path 32 along which driver assistance system 10 can guide vehicle 12 to align hitch ball 34 and coupler 14 of trailer 16. In this manner, upon initiation of driver assistance system 10, such as by user input on touchscreen 42, for example, image processing routine 64 can identify coupler 14 within the image data 55 of one or more of the cameras in imaging system 18, such as camera 48 and estimate the position 28 of coupler 14 relative to hitch ball 34 using the image data 55 to determine a distance $D_c$ to coupler 14 and an angle $\alpha_c$ of offset between coupler 14 and the longitudinal axis 13 of vehicle 12. Once the positioning $D_c, \alpha_c$ of coupler 14 has been determined and, optionally, confirmed by the user, controller 26 can take control of at least the vehicle steering system 20 to control the movement of vehicle 12 along the desired path 32 to align the vehicle hitch ball 34 with coupler 14.

Continuing with reference to FIG. 3 with additional reference to FIG. 2, controller 26, having estimated the positioning $D_c, \alpha_c$ of coupler 14, as discussed above, can, in one example, execute path derivation routine 66 to determine vehicle path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as the drawbar length L, as well as the maximum angle to which the steered wheels 76 can be turned $\delta_{max}$. As shown, the wheelbase W and the current steering angle $\delta$ can be used to determine a corresponding turning radius $\rho$ for vehicle 12 according to the equation:

$$\rho = \frac{1}{W \tan \delta},$$

in which the wheelbase W is fixed and the steering angle $\delta$ can be controlled by controller 26 by communication with steering system 20, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}}.$$

Path derivation routine 66 can be programmed to derive vehicle path 32 to align the location of the vehicle hitch ball 34 stored in memory 62 with the estimated position 28 of coupler 14 that takes into account the determined minimum turning radius $\rho_{min}$ to allow path 32 to use the minimum amount of space and maneuvers. In this manner, path derivation routine 66 can use the position of vehicle 12, which can be based on the center 36 of vehicle 12, a location along the rear axle, the location of the dead reckoning device 24, or another known location on the coordinate system 82, to determine both a lateral distance to the coupler 14 and a rearward distance to coupler 14 and derive a path 32 that achieves the needed lateral and backward movement of vehicle 12 within the limitations of steering system 20. The derivation of path 32 further takes into account the position of hitch ball 34 (e.g., as used in determining length L), relative to the tracked location of vehicle 12 (which may correspond with the center 36 of mass of vehicle 12, the location of a GPS receiver, or another specified, known area) to determine the needed positioning of vehicle 12 to align hitch ball 34 with coupler 14. In further aspects, system 10 can be further configured to shift vehicle 12 between forward-driving gears and the reverse driving gear such that the derivation of path 32 can include both forward and rearward driving of vehicle 12 to achieve the desired lateral movement, as described further in co-pending, commonly-assigned U.S. patent application Ser. No. 15/583,014, the entire contents of which are incorporated by reference herein.

Continuing with respect to FIG. 4, once the path 32 including the determination of endpoint 33 has been determined, system 10 controls the reversing of vehicle 12 toward trailer 16 to bring hitch ball 34 closer to alignment with the coupler 14. In one implementation, controller 26 can determine path 32 and endpoint 33, as discussed above, and can control the steering and braking of vehicle 12 (and, further optionally, the powertrain system 72) to control movement of vehicle 12 along path 32 to bring vehicle 12 to endpoint 33 of path 32 in the desired orientation of alignment of hitch ball 34 with coupler 14. In a similar manner, a modified variation of operating routine 68 can progress through a predetermined sequence of maneuvers involving steering of vehicle 12 at or below a maximum steering angle $\delta_{max}$, while tracking the position $D_c$, $\alpha_c$ of coupler 14 to converge the known relative position of hitch ball 34 to the desired position thereof relative to the tracked position 28 of coupler 14, as shown in FIG. 4. Subsequently, system 10 can indicate to the user that the operation is complete and the user can exit the vehicle 12 and lower the coupler 14 into the engaged position over hitch ball 34 and can secure coupler 14 with hitch ball 34 according the particular characteristics of trailer 16.

Figure 7:
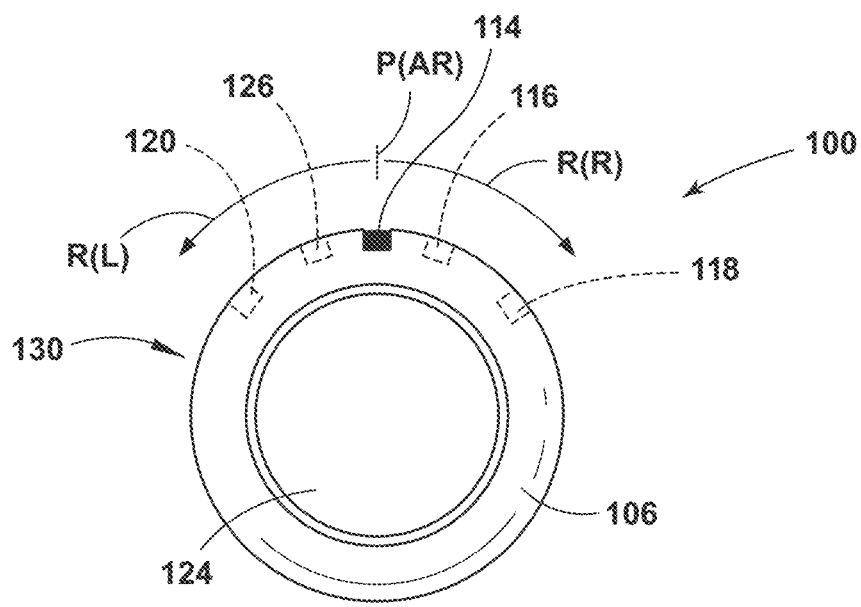
FIG. 7 is a plan view of a steering input device having a rotatable knob for operating a trailer backup assistance function of the system.
Figure 8:
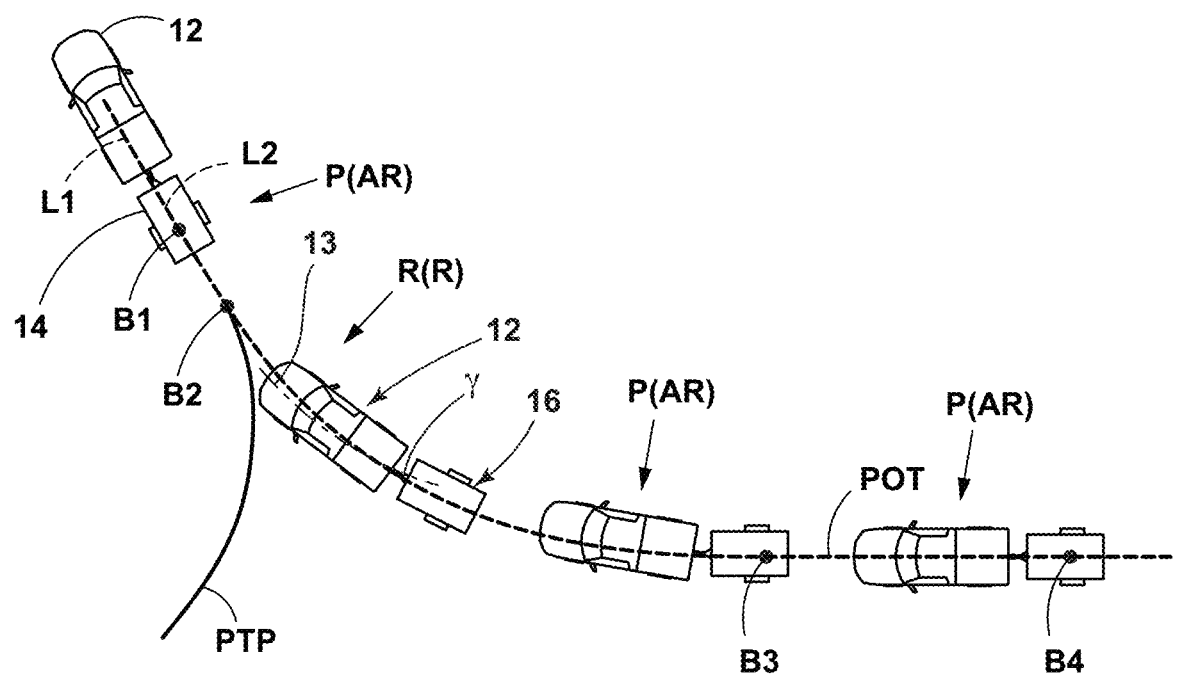
FIG. 8 is a schematic diagram showing a backup sequence of a vehicle and a trailer implementing various curvature selections with the trailer backup assist system.

Turning to FIGS. 7 and 8, in at least one implementation, the capability of system 10 to reverse vehicle 12 to an aligned position with respect to trailer 16, as described above, can be useful in connection with further capability to assist the driver in reversing trailer 16 with vehicle 12 once trailer 16 has been coupled with vehicle 12 by way of hitch ball 34. In the example discussed above, system 10 is further configured for controlling a backing path of a trailer 16 attached to a vehicle 12 by allowing a driver of the vehicle 12 to specify a desired curvature 126 of the backing path of the trailer 16. System 10 can include an interface 100 having a rotatable knob 106 in communication with controller 26, as shown in FIG. 2 such that controller 26 can operate in a trailer backup assistance mode including interpreting a first instantaneous position of the knob 106 as a trailer control commanding position and generating a vehicle steering command based thereon. In this manner, controller 26 can be adapted with a curvature routine 98, as shown in FIG. 2, and further described in commonly-assigned U.S. Pat. No. 9,102,271, the entire disclosure of which is incorporated by reference herein. In general, the operation of the trailer backup assistance mode within the operation of system 10 involves an input device 100 that includes the above-mentioned rotatable knob 106, for a driver to provide the desired curvature 126 of the combined vehicle 12 and trailer 16. As such, the steering input device 100 may be operable between a plurality of selections, such as successive rotated positions of knob 106, that each provide an incremental change to the desired curvature 126 of the combined trailer 16 and vehicle 12 during reversing. Upon inputting the desired curvature 126, the controller 26 may generate a trailer backing steering command for the vehicle 12 to guide the trailer 16 on the desired curvature 126 based on the estimated hitch angle $\gamma$ and a kinematic relationship between the trailer 16 and the vehicle 12.

As described above, the vehicle 12 may also be equipped with one embodiment of system 10 adapted with the trailer backup assistance functionality for controlling the backing path of the trailer 16 when it is attached to the vehicle 12, such as following a hitching operation, as discussed above. Referring to FIGS. 7 and 8, the vehicle 12 may be pivotally attached to the illustrated trailer 16 with a tongue 90 (FIG. 1) longitudinally extending from the remaining portions of trailer 16 with the above-described coupler 14 that latches onto the hitch ball 34 to provide a pivoting ball joint connection that allows for articulation of trailer 16 at a hitch angle γ relative to the longitudinal axis 13 of vehicle 12. In this example, the vehicle 12 can include an input 100 including a rotating element 106. The controller 26 that includes the above-described image processing routine 64 uses an input from the rotating element 106 to as a trailer backup control signal and controls the vehicle steering system 20 to maintain the vehicle 12, when coupled with trailer 16 at the hitch ball location 38, on a backing path P determined using, for example, the curvature routine 98 described below, which includes the hitch ball location 38 as an input.

Such an implementation of system 10 can use imaging system 18, as discussed above as a vision-based hitch angle sensor for estimating the hitch angle γ between the vehicle 12 and the trailer 16. In a particular example, one of the various cameras 48, 50, 52a, 52b can capture one or more images of the trailer 16, including a region containing one or more desired target placement zones for at least one target 91 to be secured. Although it is contemplated that the imaging system 18 may capture images of the trailer 16 without a target 91 to determine the hitch angle γ, in the illustrated embodiment, trailer 16 includes a target 91 to allow the system 10 to utilize information acquired via image acquisition and processing of the target 91. Other means of determining the hitch angle γ may be possible in various embodiments of system 10.

As discussed above, system 10 is in communication with the power assist steering system 20 of the vehicle 12 to operate (by way of a steering control signal or the like) the steered wheels 76 (FIG. 1) of the vehicle 12 for moving the vehicle 12 in such a manner that the trailer 16 reacts in accordance with the desired curvature 126 of the trailer 16. In this manner, a trailer backing steering command may be provided by the system 10 for autonomously steering during a backup maneuver. The power assist steering system 20 provides the controller 26 with information relating to a rotational position of steered wheels 76 of the vehicle 12, including a steering angle δ. The controller 26 in the illustrated embodiment processes the current steering angle, in addition to other vehicle 12 and trailer 16 conditions using a feedback-based control scheme (i.e. a P-I control scheme using the equation below) to guide the trailer 16 along the desired curvature 126. It is conceivable that the trailer backup assist system 10, in additional embodiments, may be an integrated component of the power assist steering system 20. For example, the power assist steering system 20 may include a trailer backup assist routine for generating vehicle steering information and commands as a function of all or a portion of information received from the steering input device 100, the imaging system 18, the power assist steering system 20, a vehicle brake control system 72, a powertrain control system 74, and other vehicle sensors and devices.

More specifically, the steering input device 100 may provide a selection or positional information that correlates with a desired curvature 126 of the desired backing path of travel of the trailer 16. Also, the trailer steering commands provided by the steering input device 100 can include information relating to a commanded change in the path of travel, such as an incremental change in the desired curvature 126, and information relating to an indication that the trailer 16 is to travel along a path defined by a longitudinal centerline axis of the trailer 16, such as a desired curvature value of zero that defines a substantially straight path of travel for the trailer. As will be discussed below in more detail, the steering input device 100 according to one embodiment may include a movable control input device for allowing a driver of the vehicle 12 to command desired trailer steering actions or otherwise select and alter a desired curvature. For instance, the moveable control input device may be a rotatable knob 106, which can be rotatable about a rotational axis extending through a top surface or face of the knob 106. In other embodiments, the rotatable knob 106 may be rotatable about a rotational axis extending substantially parallel to a top surface or face of the rotatable knob 106. Furthermore, the steering input device 100, according to additional embodiments, may include alternative devices for providing a desired curvature 126 or other information defining a desired backing path, such as a joystick, a keypad, a series of depressible buttons or switches, a sliding input device, various user interfaces on a touch-screen display, a vision based system for receiving gestures, a control interface on a portable device, and other conceivable input devices as generally understood by one having ordinary skill in the art. It is contemplated that the steering input device 100 may also function as an input device for other features, such as providing inputs for other vehicle features or systems.

For a system defined by a vehicle 12 and a trailer 16, a kinematic relationship of the vehicle 12 reversing the trailer 16 is based on various parameters associated with the vehicle 12 and the trailer 16. This relationship can be expressed to provide the steering angle δ as a function of trailer path curvature $\kappa_2$ and hitch angle γ.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K),$$

where:
  δ: steering angle at steered front wheels of the vehicle;
  α: yaw angle of the vehicle;
  β: yaw angle of the trailer;
  γ: hitch angle (γ=β−α);
  W: wheel base of the vehicle;
  L: drawbar length between hitch point and rear axle of the vehicle;
  D: distance (trailer length) between hitch point and axle of the trailer or effective axle for a multiple axle trailer; and
  $r_2$: curvature radius for the trailer.

For a particular vehicle and trailer combination, certain parameters (e.g., D, W and L) of the kinematic relationship are constant and assumed known. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 12 and trailer-specific parameters of the kinematic relationship can be inputted by a driver of the vehicle 12, determined from sensed trailer behavior in response to vehicle steering commands, or otherwise determined from signals provided by the trailer 16. Trailer path curvature $\kappa_2$ can be determined from the driver input via the steering input device 100. Through the use of the equation for providing steering angle, a corresponding steering command can be generated by the curvature routine 98 for controlling the power assist steering system 20 of the vehicle 12. As can be appreciated, the wheelbase W of vehicle 12 is generally known, but the drawbar length L varies depending on the position 38 of the particular hitch ball 34 (including by the dimensions of the ball mount 35 used to attach the hitch ball 34 to the vehicle 12). In this manner, controller 26 can, upon activation of the curvature routine 98, obtain the hitch ball position 38 from memory 62 to determine the particular drawbar length L for use in controlling steering system 20 to maintain the vehicle 12 and trailer 16 along the desired path, based on the input from the rotating element 106.

The rotating element in the form of a rotatable knob 106, as illustrated in FIG. 7, may be biased (e.g., by a spring return) to a center, or at-rest position P(AR) between opposing rotational ranges of motion R(R), R(L). In the illustrated embodiment, a first one of the opposing rotational ranges of motion R(R) is substantially equal to a second one of the opposing rotational ranges of motion R(L), R(R). To provide a tactile indication of an amount of rotation of the rotatable knob 106, a torque that biases the knob toward the at-rest position P(AR) can increase (e.g., non-linearly) as a function of the amount of rotation of the rotatable knob 106 with respect to the at-rest position P(AR). Additionally, the rotatable knob 106 can be configured with position indicating detents such that the driver can positively feel the at-rest position P(AR) and feel the ends of the opposing rotational ranges of motion R(L), R(R) approaching (e.g., soft end stops). The rotatable knob 106 may generate a desired curvature value as function of an amount of rotation of the rotatable knob 106 with respect to the at-rest position P(AR) and a direction of movement of the rotatable knob 106 with respect to the at-rest position P(AR), which itself may correspond to a zero-curvature command 126. It is also contemplated that the rate of rotation of the rotatable knob 106 may also be used to determine the desired curvature 126 output to the controller 26. The at-rest position P(AR) of the knob corresponds to a signal indicating that the vehicle 12 should be steered such that the trailer 16 is backed along a substantially straight backing path 114 (FIG. 7) zero trailer curvature request from the driver), as defined by the longitudinal direction of the trailer 16 when the knob was returned to the at-rest position P(AR). A maximum clockwise and anti-clockwise position of the knob (i.e., limits of the opposing rotational ranges of motion R(R), R(L)) may each correspond to a respective signal indicating a tightest radius of curvature (i.e., most acute trajectory or smallest radius of curvature) of a path of travel of the trailer 16 that is possible without the corresponding vehicle steering information causing a jackknife condition.

As shown in FIGS. 7 and 8, a driver can turn the rotatable knob 106 to provide a desired curvature 126 while the driver of the vehicle 12 backs the trailer 16. In the illustrated embodiment, the rotatable knob 106 rotates about a central axis between a center or middle position 114 corresponding to a substantially straight backing path 114 of travel, as defined by the longitudinal direction of the trailer 16, and various rotated positions 116, 118, 120, 122 on opposing sides of the middle position 114, commanding a desired curvature 126 corresponding to a radius of the desired backing path of travel for the trailer 16 at the commanded rotated position. It is contemplated that the rotatable knob 106 may be configured in accordance with embodiments of the disclosed subject matter and omit a means for being biased to an at-rest position P(AR) between opposing rotational ranges of motion. Lack of such biasing may allow a current rotational position of the rotatable knob 106 to be maintained until the rotational control input device is manually moved to a different position.

Additionally referring to FIG. 8, an example of using the steering input device 100 for dictating a curvature of a desired backing path of travel (POT) of the trailer 16 while backing up the trailer 16 with the vehicle 12 is shown. In preparation of backing the trailer 16, the driver of the vehicle 12 may drive the vehicle 12 forward along a pull-thru path (PTP) to position the vehicle 12 and trailer 16 at a first backup position B1. In the first backup position B1, the vehicle 12 and trailer 16 are longitudinally aligned with each other such that a longitudinal centerline axis L1 of the vehicle 12 is aligned with (e.g., parallel with or coincidental with) a longitudinal centerline axis L2 of the trailer 16. It is disclosed herein that such alignment of the longitudinal axis 13 L1, L2 at the onset of an instance of trailer backup functionality is not a requirement for operability of a trailer backup assist system 10, but may be done for calibration.

After activating the trailer backup assist system 10 (e.g., before, after, or during the pull-thru sequence), the driver begins to back the trailer 16 by reversing the vehicle 12 from the first backup position B1. So long as the rotatable knob 106 of the trailer backup steering input device 100 remains in the at-rest position P(AR) and no other steering input devices are activated, the trailer backup assist system 10 will steer the vehicle 12 as necessary for causing the trailer 16 to be backed along a substantially straight path of travel, as defined by the longitudinal direction of the trailer 16, specifically the centerline axis L2 of the trailer 16, at the time when backing of the trailer 16 began. When the trailer 16 reaches the second backup position B2, the driver rotates the rotatable knob 106 to command the trailer 16 to be steered to the right (i.e., a knob position R(R) clockwise rotation). Accordingly, the system 10 will steer the vehicle 12 for causing the trailer 16 to be steered to the right as a function of an amount of rotation of the rotatable knob 106 with respect to the at-rest position P(AR), a rate movement of the knob, and/or a direction of movement of the knob with respect to the at-rest position P(AR). Similarly, the trailer 16 can be commanded to steer to the left by rotating the rotatable knob 106 to the left. When the trailer 16 reaches backup position B3, the driver allows the rotatable knob 106 to return to the at-rest position P(AR) thereby causing the system 10 to steer the vehicle 12 as necessary for causing the trailer 16 to be backed along a substantially straight path of travel as defined by the longitudinal centerline axis L2 of the trailer 16 at the time when the rotatable knob 106 was returned to the at-rest position P(AR). Thereafter, the system 10 steers the vehicle 12 as necessary for causing the trailer 16 to be backed along this substantially straight path to the fourth backup position B4. In this regard, arcuate portions of a path of travel POT of the trailer 16 are dictated by rotation of the rotatable knob 106 and straight portions of the path of travel POT are dictated by an orientation of the centerline longitudinal axis 13 L2 of the trailer 16 when the knob 106 is in/returned to the at-rest position P(AR).

Figure 9:
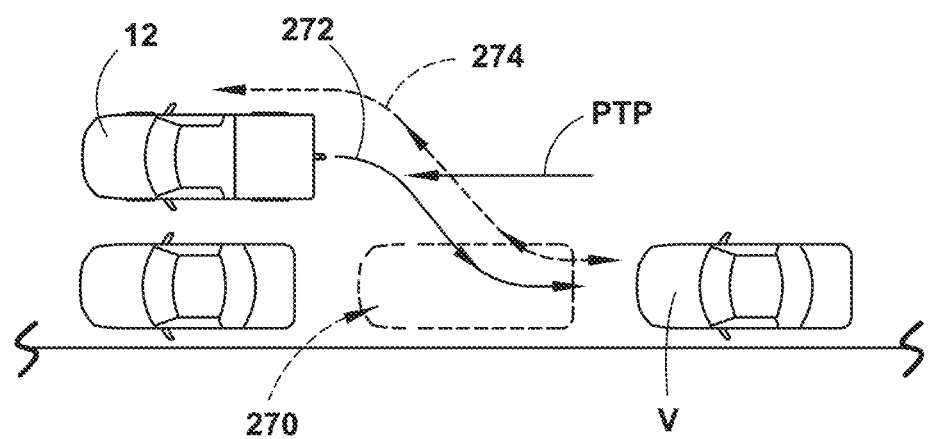
FIG. 9 is an overhead schematic view showing a sequence for maneuvering a vehicle into a parking space according to a further operation of the system.

As shown in FIG. 9, system 10 can be further configured with active park assist ("APA") functionality, as discussed further in co-pending, commonly-assigned, U.S. patent application Ser. No. 14/859,551, the entire disclosure of which is incorporated by reference herein. In general, APA may be implemented by a parking assist routine within memory 62 of system 10 that can make use of various sensors of vehicle 12, including those included in the vehicle sensor system, as well as proximity sensor array 54 and imaging system 18, to control the power assist steering system 20 (and, optionally, powertrain control system 74 and brake control system 72) to provide autonomous, semi-autonomous, or assisted parking functionality in at least one of various parking modes. The parking assist mode may be configured to only operate when no trailer 12 is coupled with vehicle 12 and may further operate in both reversing and forward driving.

As illustrated in FIG. 9, the park-assist system can be capable of providing parallel-parking assistance. In this example, a user can, upon positioning vehicle 12 in an appropriate location with respect to a parallel parking space 270, can enter a predetermined command to send a park assist initiation signal to controller 26. The user can then select or confirm the desired mode, e.g. parallel park, including by way of HMI 40, or the like. When implementing the parallel park assist mode, controller 26 can await a further selection of a side of vehicle 12 on which the parallel parking space 270 is located. When the selection of the appropriate vehicle 12 side (the driver side in the example depicted in FIG. 9) is made controller 26 can implement the desired or available parallel parking assist mode. In one example, such a mode can be a semi-autonomous parallel parking mode, wherein the user retains control of the speed of vehicle by the throttle and brake (in a manner similar to the above-described trailer backup assist mode) with the vehicle 14 indicating the distance to adjacent vehicles using proximity alerting by audible signals or by visual indication on display 44, which can also be used to provide instructions ("reverse," "pull forward," etc.) to the driver of vehicle 14. Simultaneously, the park-assist system can control the steering system 20 such that vehicle 12 follows a parallel park-in path 272. In another mode, system 10 can implement a fully-autonomous parallel parking mode in which vehicle 12 can both control steering system 20 as well as brake system 70 and powertrain control system 72 to control the speed of vehicle 14 while controlling the steering such that vehicle 14 follows the parallel park-in path 272. Other modes of parallel park assist are possible and can be implemented in a similar manner.

As can be appreciated, when system 10 is controlling the movement of vehicle 12 along path 272, including under autonomous or guided movement, it may approach an adjacent vehicle V, or other object, in a reversing direction. Although system 10 can be configured to only implement the APA function when no trailer is present, the vehicle 12 may still have hitch ball 34 installed therewith. In this manner, it may be advantageous for system 10 to account for the location 38 of hitch ball 34 to prevent hitch ball 34 from colliding with vehicle V, for example. Accordingly, when controller 26 executes the desired park assist routine 134 including possible reverse driving, it can access the hitch ball location 38 stored in memory 62. In additional examples, the controller 26 may also include the capability to implement other systems that control braking of vehicle 12 to prevent rear collisions when driving in reverse, controller 26 can similarly access the information in memory 62 regarding whether a hitch ball 34 is present and, if so, the position 38 thereof for similar use in connection with those systems.

Figure 10:
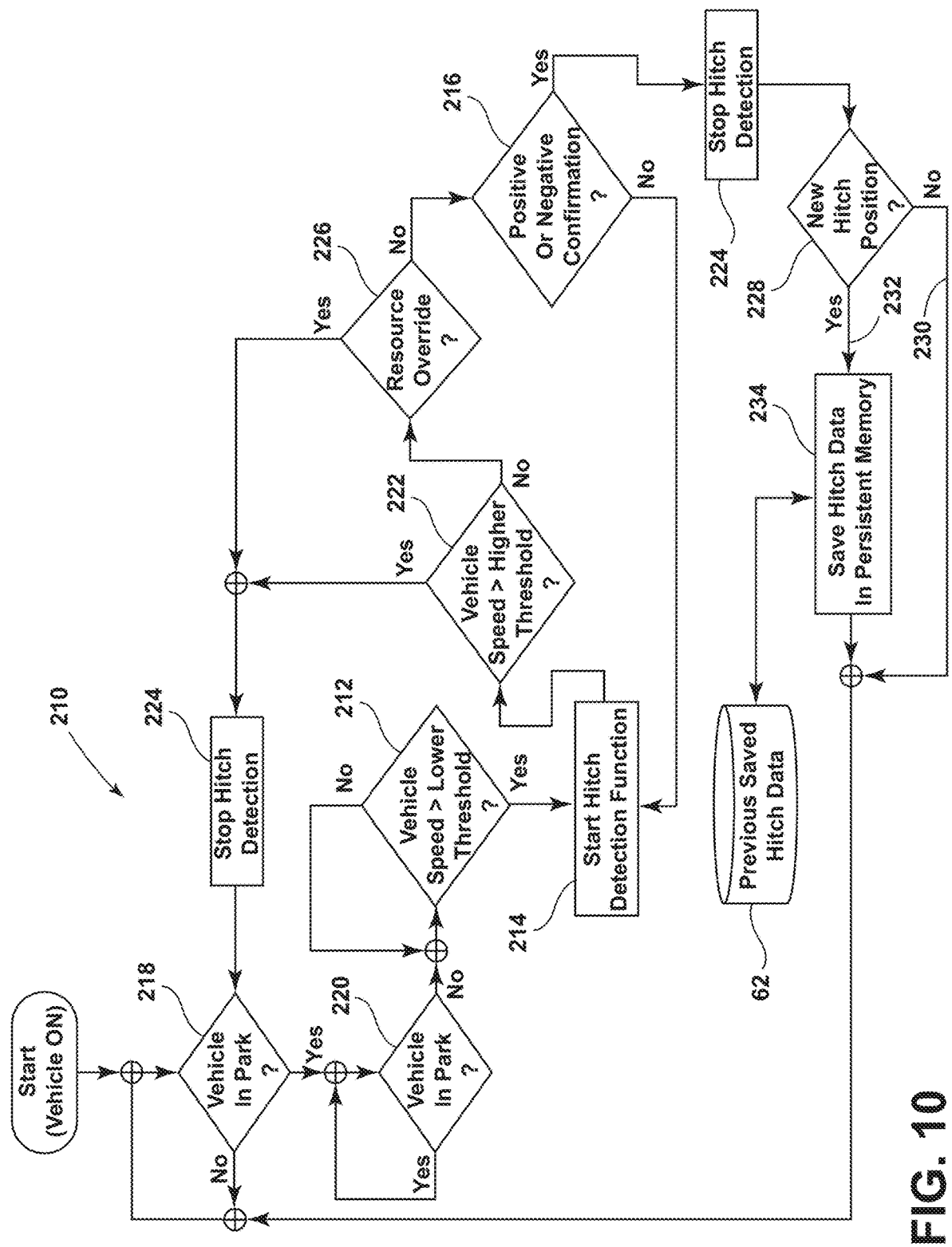
FIG. 10 is a flowchart depicting steps in the hitch ball identification and location process.

Turning now to FIG. 10, a flowchart showing steps in a method 210 employed, for example, by controller 26 to determine the location 38 of hitch ball 34 to store in memory 62 for use by one or more of the above-mentioned driver assistance functions. In particular the method 210 includes monitoring 212 the signal from a vehicle speed detector 56. When the signal from the vehicle speed detector 56 indicates a vehicle speed above a predetermined minimum speed 212, the above-described feature extraction function is run 214 using the image data received 55 from the imager (e.g., camera 48) mounted with and directed to a rear of the vehicle 12 to identify 216 hitch ball 34 mounted to the vehicle 12 in the image data 55. The location 38 of the hitch ball 34 is then extracted from an output of the feature extraction function.

As discussed above, the method can be configured such that the sequence only proceeds once the vehicle 12 shifts from park 218 to out of park 220. In this particular implementation, only after the vehicle is shifted out of park 220 does the process wait for vehicle 12 to accelerate above the minimum speed 212. The minimum speed may be calibrated to the specific performance of image processing routine 64. In practice, this number may be a relatively slow speed, for example around 1 Kph. As discussed above, if the minimum speed chosen is too slow, the background B (FIG. 5A) behind the hitch ball may not change enough to lead to significant performance benefit. If the value is too high, then the background B becomes too uniform, as it may be a road or highways with a resulting, unchanging appearance.

Once the vehicle is moving fast enough 212, the controller 26 executes 214 the hitch detection function using image processing routine 64. The routine 64, thusly, searches for a hitch ball 34, which may be done, for example, using a Hough transform or similar method. To laterally constrain the search within the camera 48 image data 55, the function may only operate along the vehicle centerline. This prevents the function from identifying a feature to the side of the actual hitch ball 34 as the hitch ball 34. To longitudinally constrain the search within the camera 48 image data 55, a maximum drawbar length L may be used and translated to a vertical position on the rear camera 48 image data 55. This may prevent the function from falsely detecting a hitch ball at an unrealistic distance from the vehicle 12 (i.e. at a position greater than 2 meters from the bumper). As discussed above, the search is continuous, such that each new frame of image data 55 is analyzed. Each determination is filtered to provide a convergence of the detection.

As also discussed above, if the vehicle speed exceeds a higher maximum speed 222, the controller 26 may stop 224 running the hitch detection function, as above a certain speed, there is no longer any benefit to continue running the function, since the background blurs to the point of uniformity. The function is not designed to operate during the entire drive time. Once the position 38 of hitch ball 34 is identified 224, the function ceases, and controller 26 awaits the next opportunity when the vehicle is shifted into 218 and out of Park 220.

The controller 26 may be further configured to treat the hitch detection function as a low priority task. In this respect, if the ECU resources are in demand 226, the hitch detection function is stopped 224, to make further processing resources available to the higher priority functions. Again, once the function ceases 224, it awaits the next opportunity when the vehicle is shifted into 218 and out of Park 220.

When the hitch detection function reaches a confidence in its detection. If the function can confidently assert it has found the hitch or determined 216 that no hitch is present, with little uncertainty, the function ceases 224. If there is not enough confidence in this determination, then the function continues searching 214 and evaluating new incoming camera frames in image data 55. With a positive detection, or the detection of no hitch present 216, controller 26 compares 228 the output of the hitch detection function to any previous hitch ball position data already stored in memory 62. Again, this step limits the number of times the data is written to memory 62 to prevent wear. If the data has not changed 230, then the system 10 does not overwrite the data. If the data differs 232 from the last (or previous) time the hitch detection function was run, it is saved 234 to memory 62, overwriting the previous data. The saved data is accessible to the controller when subsequently executing the hitch detection function using image processing routine 64. It is also available to other features that use this data, as discussed above. Again, before the controller 26 restarts the hitch detection function, it waits until the vehicle is placed back into park 218, to take into account that the condition of the hitch 34 most likely does not change without the vehicle being in Park.

Figure 11:
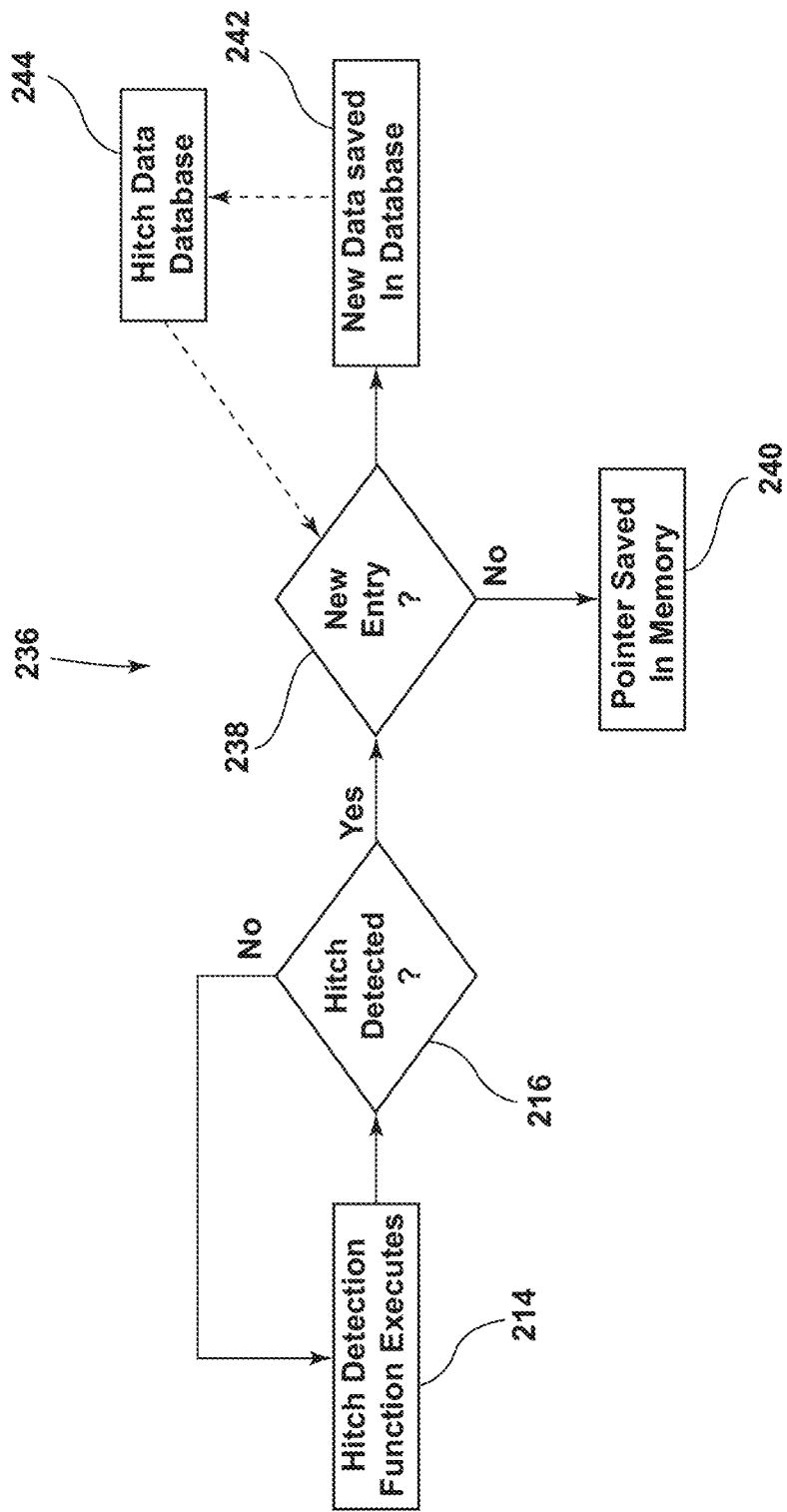
FIG. 11. is a flowchart depicting steps for storing and accessing hitch ball location information from system memory.

In a further aspect, shown in FIG. 11, the system may save all previously detected hitch positions 38 in a database within memory 62. This functionality compensates for the fact that drivers may own several hitches 34 and may switch between using those various hitches 34. In this implementation, all the detected hitch positions 38 are stored together in the database, along with a pointer (database address) to indicate the position 38 of the hitch 34 that is currently installed with the vehicle 12 per the last hitch detection. In particular, the hitch detection function is first run 214, as discussed with respect to FIG. 10. If a hitch is not detected, the function continues searching for a hitch 34. If a hitch is detected, the system 10 prepares to save 236 the data in memory 62. The system 10, according to the present process, evaluates 238 if the detected hitch position 38 matches a previously detected hitch position 38. If so, there is no need to overwrite the same data, as this may create memory wear on the flash memory 62. If the hitch position 38 is a new detection 242, then this data is added 244 to the database of hitch positions.

If the hitch position 38 is detected as something that has previously been saved 242, then the system 10 indicates which of the database entries is the currently-detected hitch position 38. Because that there are multiple database entries, this pointer indicates which entry is the hitch position 38 that is currently installed on the vehicle. This is achieved by a pointer that indicates 242 the memory address of the entry. A newly discovered hitch position 38 is added 244 to the database of all known hitch positions. The hitch data database saves all previously detected hitch positions, available for retrieval by the system 10 at any time, across vehicle power cycles. This can be achieved using flash memory, as discussed above.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle control system, comprising:
   an imager mounted with and directed to a rear of a vehicle and outputting image data including a series of still image frames at sequential intervals;
   a vehicle speed sensor mounted with the vehicle and outputting vehicle speed data; and
   an image processor receiving the image data and the vehicle speed data and programmed to:
   monitor a signal from the vehicle speed sensor; and
   when the signal from the vehicle speed sensor indicates a vehicle speed above a predetermined minimum speed, execute a feature extraction function, including a continuous analysis of successive still images, to locate a hitch ball mounted to the vehicle in the image data.

2. The system of claim 1, further including a vehicle switchgear configurable between a park mode and at least one driving mode, wherein:
   the image processor receives a state indication from the switchgear and;
   the image processor executes the feature extraction function to locate the hitch ball only when the switchgear state indication corresponds with the vehicle being shifted from the park mode into the at least one driving mode and the signal from the vehicle speed sensor indicates the signal above the predetermined minimum speed.

3. The system of claim 1, wherein the image processor executes the feature extraction function to locate the hitch ball only when the signal from the vehicle speed sensor indicates the signal above the predetermined minimum speed and below a predetermined maximum speed.

4. The system of claim 1, wherein:
the continuous analysis of successive still images includes deriving a preliminary hitch ball location for each of the successive still images; and
the feature extraction routine filters the preliminary hitch ball location for each of the successive still images to converge on a final hitch ball location.

5. The system of claim 4, wherein:
the feature extraction routine converges on a final hitch ball location using an algorithmic confidence assessment based on the analysis of successive still images; and
the final hitch ball location is determined when the confidence assessment reaches a predetermined threshold.

6. The system of claim 4, wherein the final hitch ball location includes one of a distance of a detected hitch ball from a rear of the vehicle or a null value when no hitch ball is located when the confidence assessment reaches a predetermined threshold.

7. The system of claim 1, wherein:
the image processor executes the feature extraction function to locate the hitch ball mounted to the vehicle in the image data when the signal from the vehicle speed sensor indicates a vehicle speed above a predetermined minimum speed over a time interval until the hitch ball has been located; and
the image processor stops the feature extraction function when one of the hitch ball has been located or the signal from the vehicle speed sensor indicates that the vehicle speed has changed to below the predetermined minimum speed.

8. The system of claim 1, wherein the image processor stores a location of the hitch ball in memory when the feature extraction function locates the hitch ball.

9. The system of claim 8, wherein:
the image processor compares the location of the hitch ball to at least one previously stored hitch ball location prior to storing the location of the hitch ball in memory; and
only stores the location of the hitch ball in memory if the location of the hitch ball is different from the one or more previously stored hitch ball location.

10. The system of claim 8, further including a vehicle steering system, wherein:
the image processor is included in a controller that:
derives position data for a coupler of a trailer using the image data;
derives a vehicle path to position the location of the hitch ball stored in memory in an aligned position with the coupler; and
outputs a steering control signal to the steering system to maintain the vehicle along the path.

11. The system of claim 8, further including:
a vehicle steering system; and
an input including a rotating element;
wherein the image processor is included in a controller that:
uses an input from the rotating element to as a trailer backup control signal; and
controls the vehicle steering system to maintain the vehicle, when coupled with a trailer at the hitch ball location, on a backing path determined using the hitch ball location.

12. The system of claim 8, further including a vehicle brake system, wherein:
the image processor is included in a controller that executes at least one automated reverse braking feature based on a position of the rear of the vehicle including the hitch ball location.

13. A vehicle, comprising:
a vehicle steering system;
an imager mounted with and directed to a rear of the vehicle and outputting image data including a series of still image frames at sequential intervals;
a vehicle speed sensor mounted with the vehicle and outputting vehicle speed data; and
a controller:
operating in a free driving mode including:
receiving the image data and the vehicle speed data;
monitoring a signal from the vehicle speed sensor; and
when the signal from the vehicle speed sensor indicates a vehicle speed above a predetermined minimum speed, executing a feature extraction function, including a continuous analysis of successive still images, to determine a location of a hitch ball mounted to the vehicle in the image data; and
operating in a hitch assist driving mode including outputting a steering control signal to the steering system in reversing of the vehicle to align the hitch ball location with a coupler of a trailer.

14. The vehicle of claim 13, wherein in the hitch assist driving mode, the controller further:
derives position data for a coupler of a trailer using the image data;
derives a vehicle path to position the location of the hitch ball in an aligned position with the coupler; and
outputs the steering control signal to the steering system to maintain the vehicle along the path to align the hitch ball location with a coupler of a trailer.

15. The vehicle of claim 13, further including an input having a rotating element;
wherein the controller further operates in a trailer backup assist mode including:
using an input from the rotating element to as a trailer backup control signal; and
controlling the vehicle steering system to maintain the vehicle, when coupled with a trailer at the hitch ball location, on a backing path determined using the hitch ball location.

16. The vehicle of claim 13, further including a vehicle brake system;
wherein the controller further operates in an automated reverse braking mode including controlling the vehicle brake system based on a position of the rear of the vehicle including the hitch ball location.

17. The vehicle of claim 13, further including a vehicle switchgear configurable between a park mode and at least one driving mode, wherein the controller:
receives a state indication from the switchgear and;
executes the feature extraction function to determine the hitch ball location only when the switchgear state indication corresponds with the vehicle being shifted from the park mode into the at least one driving mode and the signal from the vehicle speed sensor indicates the signal above the predetermined minimum speed.

18. The vehicle of claim 17, wherein the controller executes the feature extraction function to locate the hitch ball only when the signal from the vehicle speed sensor indicates the signal above the predetermined minimum speed and below a predetermined maximum speed.

19. A method for determining the location of a hitch ball coupled with a vehicle, comprising:
- receiving image data, including a series of still image frames at sequential intervals, form an imager mounted with and directed to a rear of the vehicle
- monitoring a signal from a vehicle speed sensor; and
- when the signal from the vehicle speed sensor indicates a vehicle speed above a predetermined minimum speed, execute a feature extraction function, including a continuous analysis of successive still images, on the image data to identify a hitch ball mounted to the vehicle in the image data; and
- extracting the location of the hitch ball from an output of the feature extraction function.

\* \* \* \* \*